United States Patent [19]
Eguchi et al.

[11] Patent Number: 5,868,402
[45] Date of Patent: Feb. 9, 1999

[54] MOTORIZED CART

[75] Inventors: Yasuhiko Eguchi; Toru Kakehi, both of Neyagawa, Japan

[73] Assignee: Exedy Corporation, Neyagawa, Japan

[21] Appl. No.: 858,711

[22] Filed: May 9, 1997

[30] Foreign Application Priority Data

May 23, 1996 [JP] Japan .................................... 8-128150

[51] Int. Cl.$^6$ .................................................. B62B 5/02
[52] U.S. Cl. .................................... 280/5.2; 280/DIG. 10
[58] Field of Search ........................... 280/5.2, DIG. 10, 280/DIG. 5, 5.24, 5.32; 180/907

[56] References Cited

U.S. PATENT DOCUMENTS 4,639,002  1/1987  Karpisek .................................. 280/5.2
5,516,127  5/1996  Glazer et al. ............................ 280/5.2

FOREIGN PATENT DOCUMENTS 4317228  12/1993  Germany ........................... 280/33.994

*Primary Examiner*—Paul N. Dickson
*Attorney, Agent, or Firm*—Shinjyu An Intellectual Property Firm

[57]  ABSTRACT

A motorized cart is disclosed which allows a rider to safely ride an escalator. The motorized cart includes front wheels 2 and rear wheels 3 mounted on a vehicle body 1. A first support portion 6 is formed on the bottom of the vehicle body 1, and includes a plurality of contact portions which support the vehicle body 1 on the step surfaces of the escalator when it reaches the maximum inclined portion of the escalator.

16 Claims, 10 Drawing Sheets

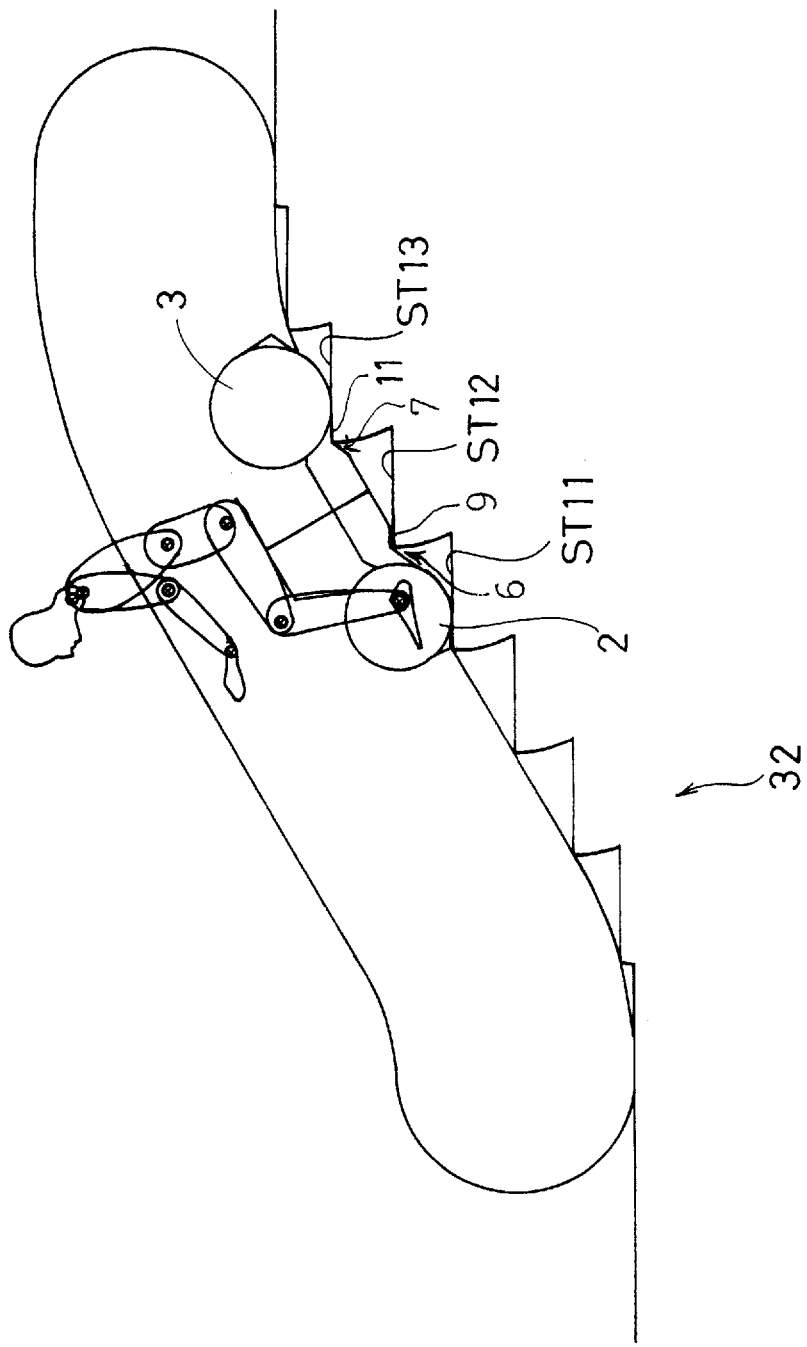

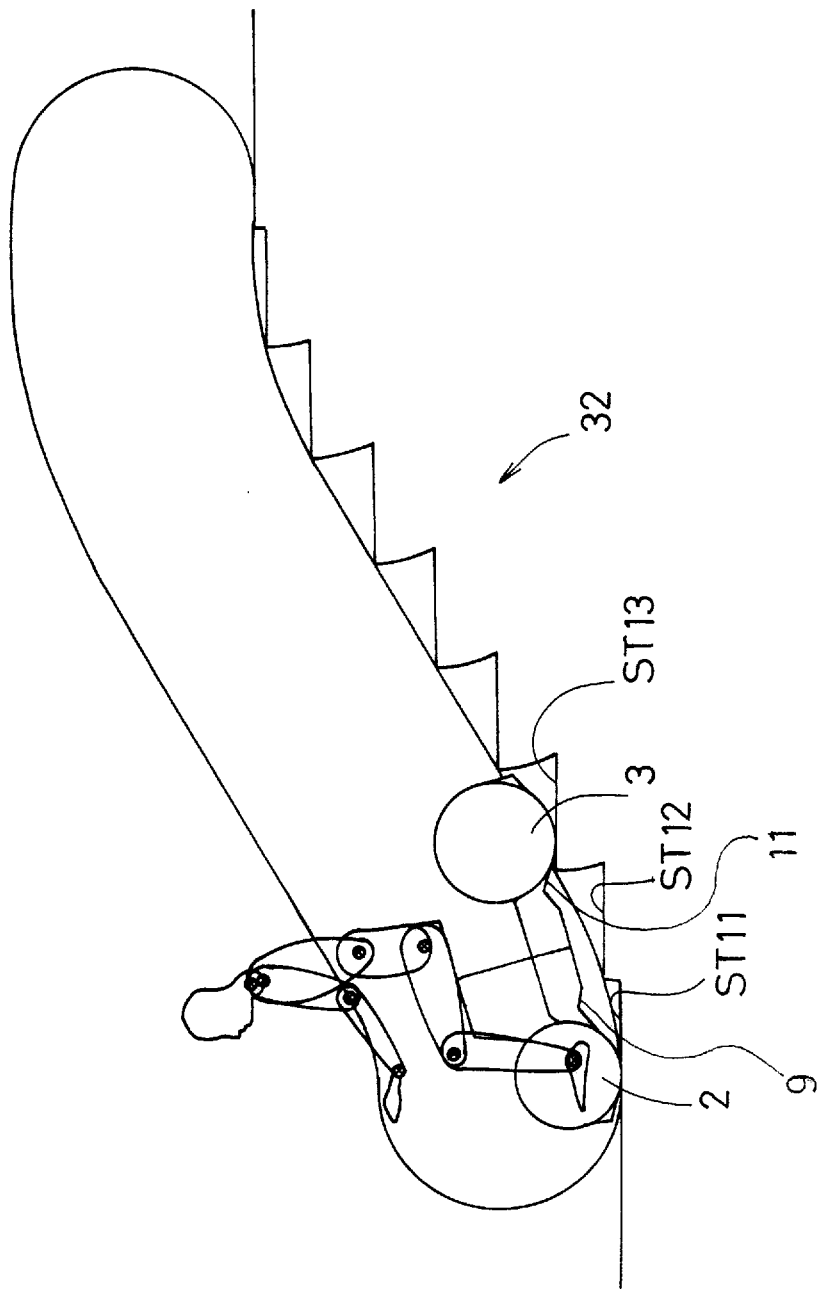

MOTORIZED CART

BACKGROUND OF THE INVENTION

A. Field of the Invention

The present invention relates to a motorized cart, and more particularly to a motorized cart which allows a rider to safely ride up and down an escalator while in a seated position.

B. Related Art

There are numerous types of motorized carts in the prior art which are designed to allow its passenger to descend and ascend a flight of stairs. For example, a so-called "crawler type" vehicle has been proposed in which a plurality of wheels are arranged under the vehicle body, with a belt extending around the wheels. With this type of device, hook claws or the like are provided on an outer surface of the belt. In addition, a motorized cart that includes front wheels, rear wheels, and auxiliary wheels on the vehicle body which can be raised and lowered has been proposed.

All of the above-proposed motorized carts are designed to descend and ascend a flight of stairs, however they are not designed to ride on an escalator.

In particular, with respect to the "crawler" type motorized cart, an intermediate portion of the belt will come into contact with the corners of each step on the escalator, thus decreasing the total contact area of the belt. It is therefore difficult to keep the vehicle in a stable position on the escalator.

With the motorized cart having front and rear wheels, the front wheels and the rear wheels will each be positioned on different steps of the escalator. If the braking on the front and rear wheels is not suitable, there is a possibility that the vehicle could slip backward. In addition, when the corners of the steps of the escalator come into contact with the bottom of the motorized cart located between the front and rear wheels, the front or rear wheels may be lifted off of the steps so that the vehicle is slanted at a much larger angle than the slant angle of the escalator. This is quite dangerous.

SUMMARY OF THE INVENTION

An object of the present invention is to provide a motorized cart which allows a rider to safely travel on an escalator.

A motorized cart for riding on an escalator includes a vehicle body, front wheels mounted on a front portion of the vehicle body, rear wheels mounted on a rear portion of the vehicle body, a drive means for driving at least one of the front wheels and the rear wheels, and a support portion formed on the vehicle body. The support portion is brought into contact with a plurality of step surfaces on the escalator when the vehicle body reaches a maximum inclined portion of the escalator.

The motorized cart is advanced onto the escalator by means of the drive means. As the step surfaces of the escalator are gradually moved upward or downward to the maximum slant angle, at least one step surface comes into contact with the support portion. Accordingly, the motorized cart is moved upward or downward with the support portion in contact with the step surfaces of the escalator. At the terminal portion of the escalator, the slant angle is gradually decreased, and the support portion is separated away from the step surface so that the front wheels and rear wheels may be driven.

According to another aspect of the invention, the support portion further includes a first support portion formed on a lower forward portion of the vehicle body, and a second support portion formed on a lower rear portion of the vehicle body. When the vehicle body reaches the maximum inclined portion of the escalator, the first support portion is brought into contact with one step surface of the escalator, and the second support portion is brought into contact with another step surface of the escalator.

Here, the first and second support portions are brought into contact with different step surfaces of the escalator, to thereby prevent the vehicle body from falling off the escalator.

According to yet another aspect of the invention, the support portion includes a plurality of contact surfaces that are brought into contact with the step surfaces of the escalator when the escalator is ascending, and a plurality of contact surfaces that are brought into contact with the step surfaces of the escalator when the escalator is descending. This allows the vehicle to ride on the escalator either upward or downward in safety.

According to yet another aspect of the invention, when the support portion is brought into contact with a plurality of step surfaces on the escalator, one or more wheels which are driven by the drive means are separated away from the step surfaces of the escalator. Thus, even if the drive force is accidentally applied to the wheels when the vehicle is on the escalator, the vehicle will safely maintain its position without any displacement.

Other objects, features, aspects and advantages of the present invention will be apparent from the following detailed description of the present invention when taken in conjunction with the accompanying drawings, in which like reference numerals designate the same or similar parts throughout.

BRIEF DESCRIPTION OF THE DRAWINGS

FIG. 10 is a schematic view the motorized cart depicted in FIG. 9 fully mounted on a descending escalator; and FIG. 11 is a schematic view showing the motorized cart depicted in FIG. 9 dismounting a descending escalator.

DESCRIPTION OF THE PREFERRED EMBODIMENTS

Figure 1:
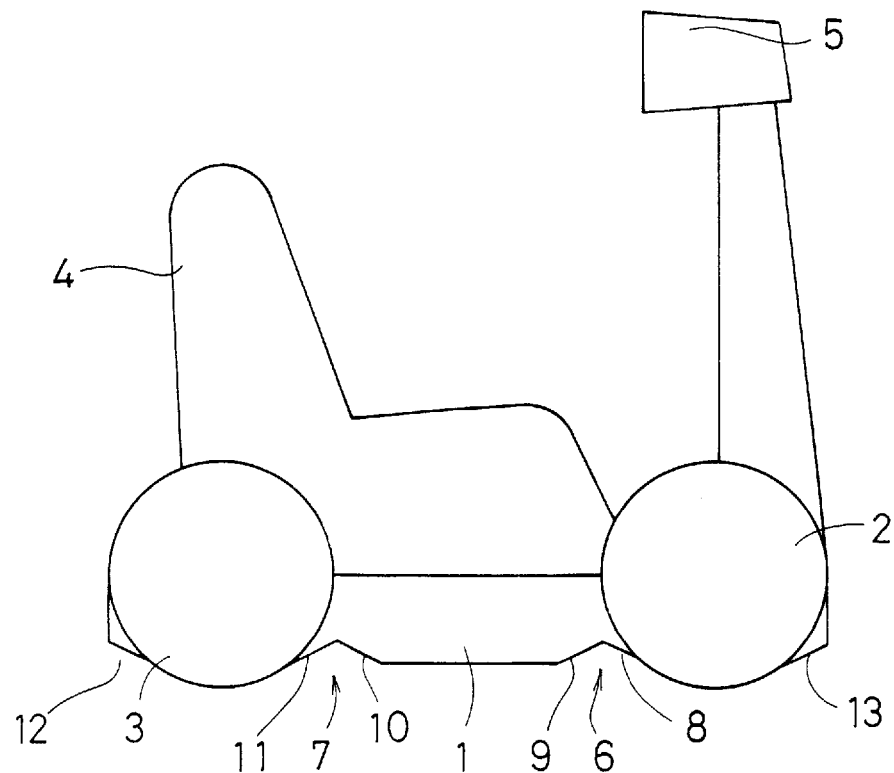
FIG. 1 is a side elevational view showing a motorized cart according to one embodiment of the invention.
Figure 2:
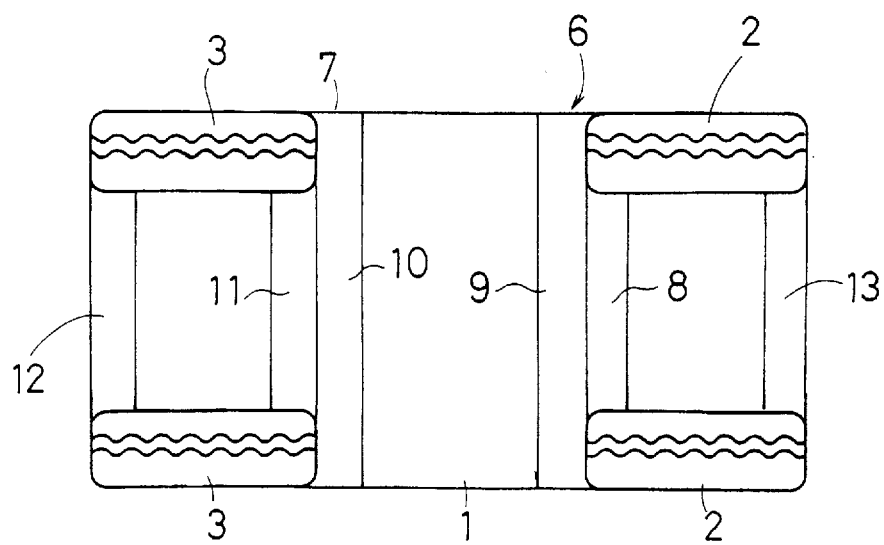
FIG. 2 is a schematic bottom view of the motorized cart depicted in FIG. 1.

A motorized cart according to one embodiment of the present invention will now be described with reference to the accompanying drawings. FIG. 1 is a side elevational view of the motorized cart according to this embodiment and FIG. 2 is a bottom view thereof.

The motorized cart includes a vehicle body 1, a pair of right and left front wheels 2, 2 mounted on a lower front portion of the vehicle body 1, and a pair of right and left rear wheels 3, 3 mounted on a lower rear portion of the vehicle body 1. The rear wheels 3 can be rotated in a forward direction and a reverse direction by means of a motor (not shown). The front wheels 2, 2 may be steered by a steering mechanism (not shown). A seat 4 and an operation panel 5 are provided on an upper portion of the vehicle body 1. The operation panel 5 includes a number of features not shown in the figures, including a main switch, a lever for controlling speed, a lever for adjusting the steering angle of the front wheels 2, a brake switch, other key and buttons, and a display.

A first support portion 6 and a second support portion 7 are provided on a bottom surface of the vehicle body 1. The first support portion 6 supports the front portion of the vehicle body 1 when riding on an escalator. The first support portion 6 includes a first contact surface 8 that is brought into contact with the surface of one step on an ascending escalator, and a second contact surface 9 that is brought into contact with the surface of one step on an descending escalator. The second support portion 7 supports the rear portion of the vehicle body 1 when riding on an escalator. The second support portion 7 includes a first contact surface 10 that is brought into contact with the surface of one step on an ascending escalator, and a second contact surface 11 that is brought into contact with the surface of one step on an descending escalator.

A third support portion 12 located on the rear end of the vehicle body 1 is brought into contact with the surface of one step on an ascending escalator, and a fourth support portion 13 located on the front end of the vehicle body 1 brought into contact with the surface of one step on an descending escalator.

The contact surfaces of the first support portion 6, the second support portion 7, the third support portion 12 and the fourth support portion 13 are made of a material having a large frictional coefficient, such as rubber or the like, or have a surface which has a high frictional coefficient.

Figure 4:
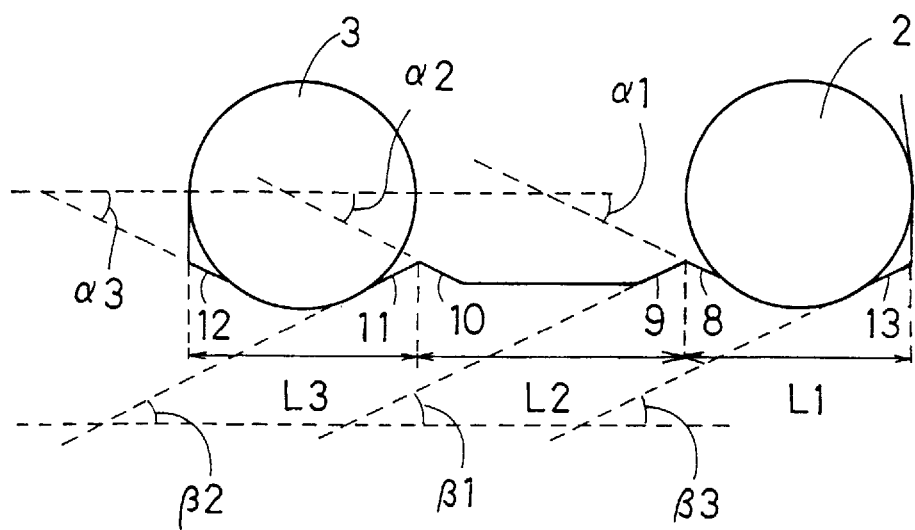
FIG. 4 is a schematic structural view showing the lower portion of the motorized cart depicted in FIG. 1.

As shown in FIG. 4, the angles of the first contact surface 8 on the first support portion 6, the first contact surface 10 on the second support portion 7, and the third support portion 12 relative are ($\alpha 1$, $\alpha 2$, and $\alpha 3$ respectively, and the angles of the second contact surface 9 of the first support portion 6, a second contact surface 11 of the second support portion 7, and the fourth support portion 13 relative to the horizontal surface are $\beta 1$, $\beta 2$ and $\beta 3$ respectively. The distance from the front end to the intermediate portion of the first support portion 6 is L1, the distance from the intermediate portion of the first support portion 6 to an intermediate portion of the second support portion 7 is L2, and the distance from an intermediate portion of the second support portion 7 to the rear end is L3.

Figure 3:
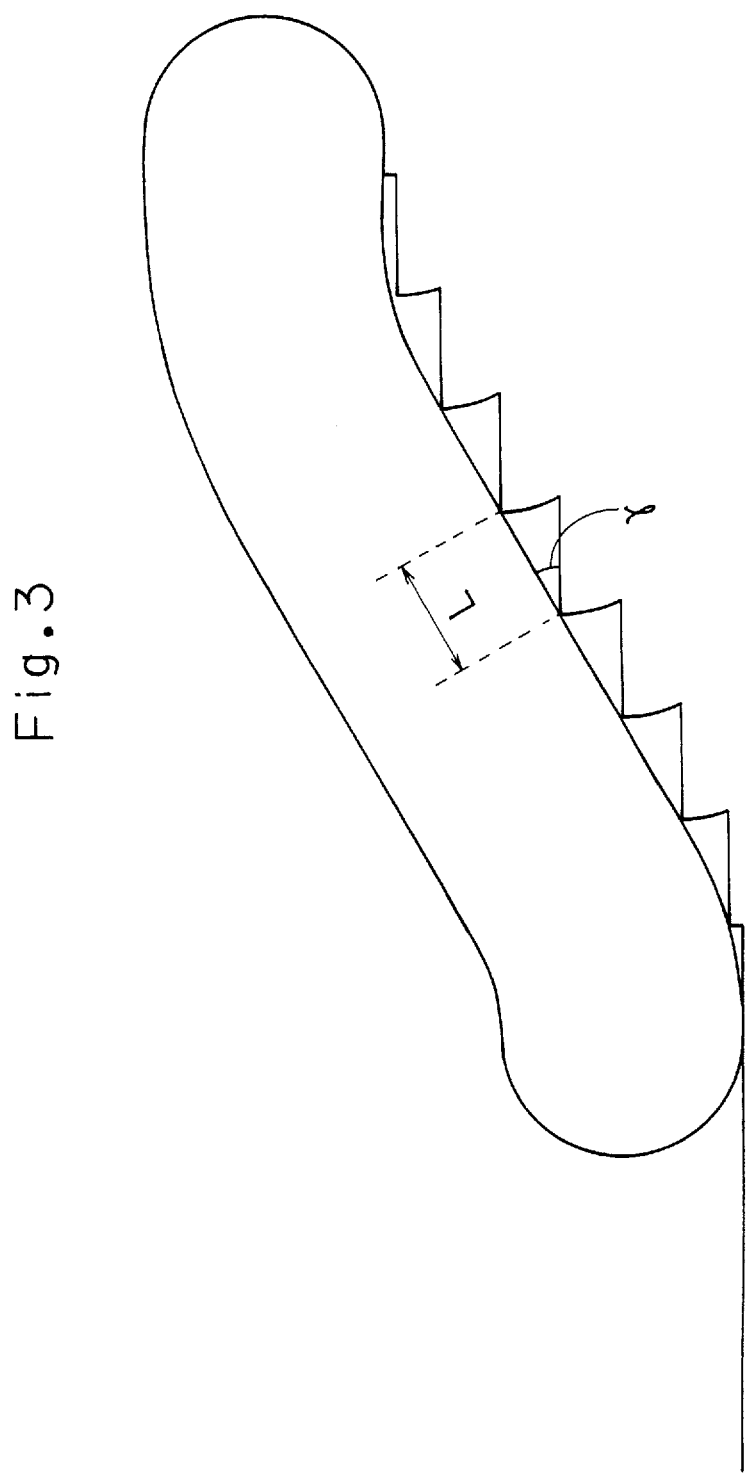
FIG. 3 is a schematic structural view showing the step surfaces of an escalator.

It is possible to regard both the distance between the corners of each step of an escalator and the maximum slant angle thereof as a constant because an ascending escalator and a descending escalator differ only in the direction of movement. Accordingly as shown in FIG. 3, assuming that the maximum slant angle of the escalator is $\gamma$, and the distance between each corners of the respective steps is L, the respective parameters in the motorized cart according to this embodiment should be set to meet the following formulae:

$$L1, L3 < L \text{ and } L2 = L.$$

Figure 5:
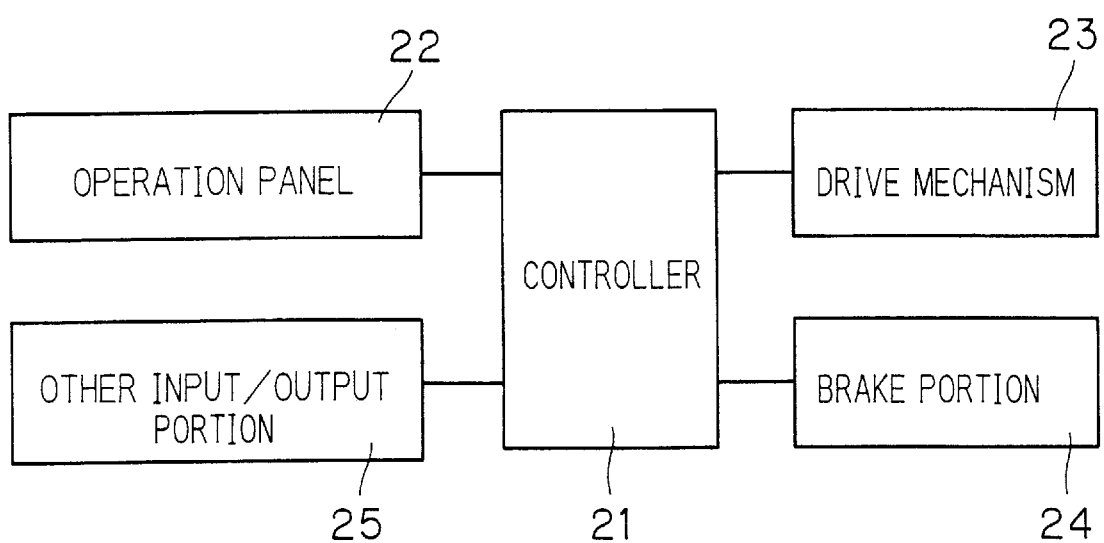
FIG. 5 is a control block diagram for the motorized cart depicted in FIG. 1.

As shown in FIG. 5, a controller 21 is provided in the motorized cart. The controller 21 includes a microcomputer which includes a CPU, ROMs, RAMs and the like. An operation panel 22, a drive mechanism 23 for driving the rear wheels 3, 3, a brake portion 24 for braking, and other input/output portions 25 are connected to the controller 21.

Using the motorized cart of the present invention to ride on an ascending escalator will now be described.

Figure 6:
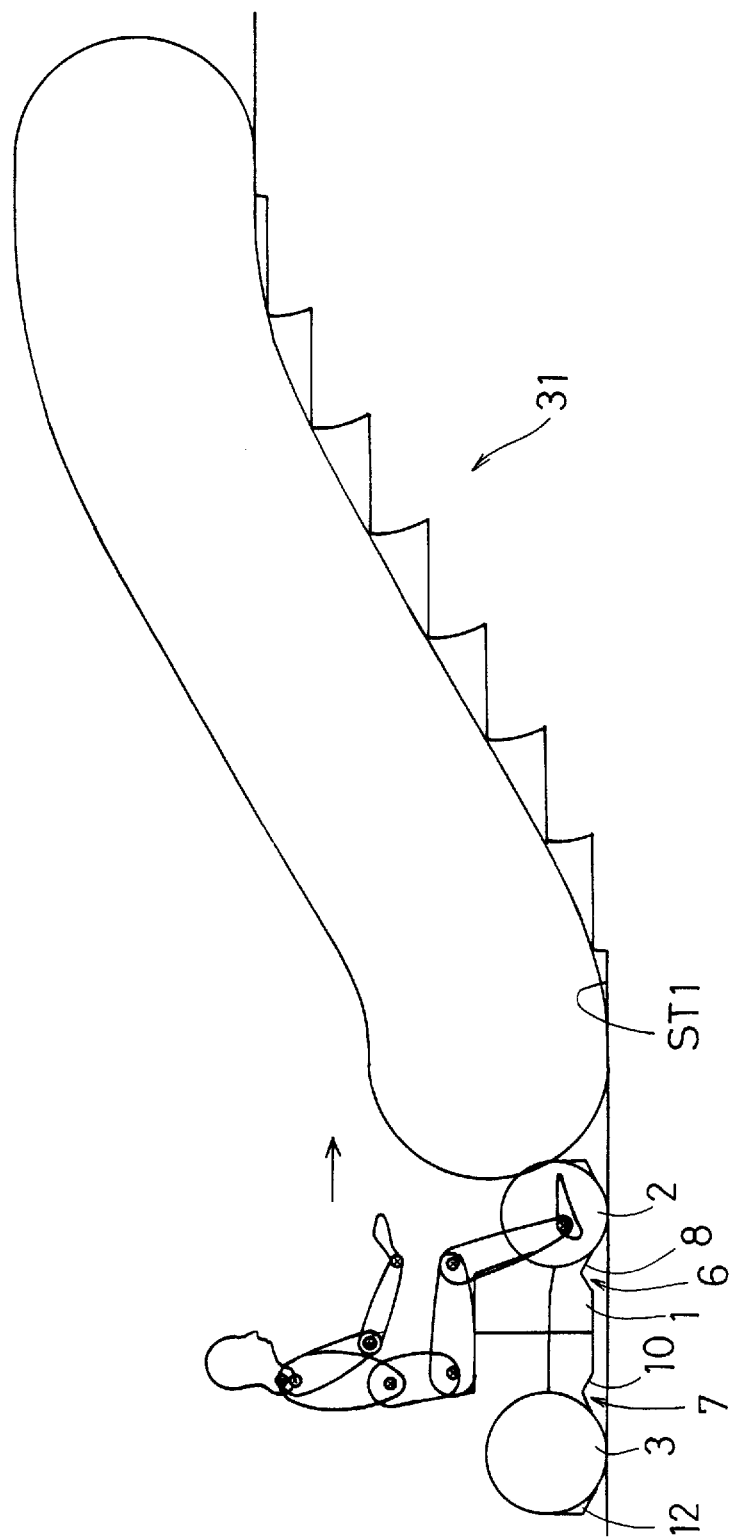
FIG. 6 is a schematic view showing the motorized cart depicted in FIG. 1 at the bottom of an ascending escalator.

As shown in FIG. 6, when the motorized cart approaches the bottom of the ascending escalator 31, the vehicle body 1 is advanced until the front wheels 2 are positioned on the step surface ST1. The cart is advanced by driving the rear wheels 3, 3 by means of the drive mechanism 23 at substantially the same speed as that of the escalator 31. Since the step surface ST1 moves upward (in the figure), the front wheels on the step surface ST1 are moved upward, and simultaneously, the vehicle body 1 is gradually slanted upward.

Figure 7:
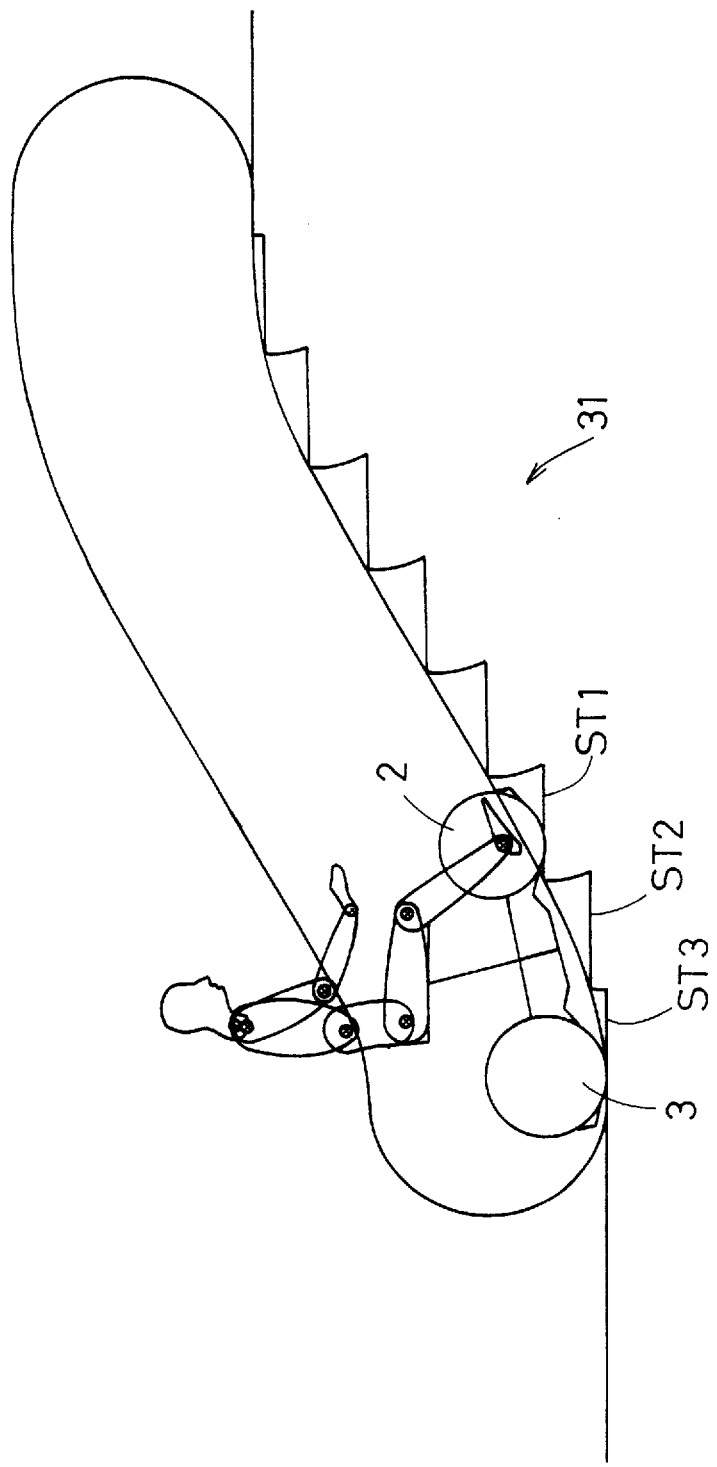
FIG. 7 is a schematic view showing the motorized cart depicted in FIG. 6 mounting an ascending escalator.

As shown in FIG. 7, when the rear wheels 3, 3 reach the step surface ST3, the vehicle body 1 is stopped by the brake portion 24. After the front wheels 2, 2 and the rear wheels 3, 3 have been placed on the step surfaces, the slant angle of the vehicle body 1 is increased and the cart is moved upward. In addition, the front wheels 2, 2 and the rear wheels 3, 3 will be lifted off the step surfaces slightly, thus preventing the cart from moving forward or backward under its own power.

Figure 8:
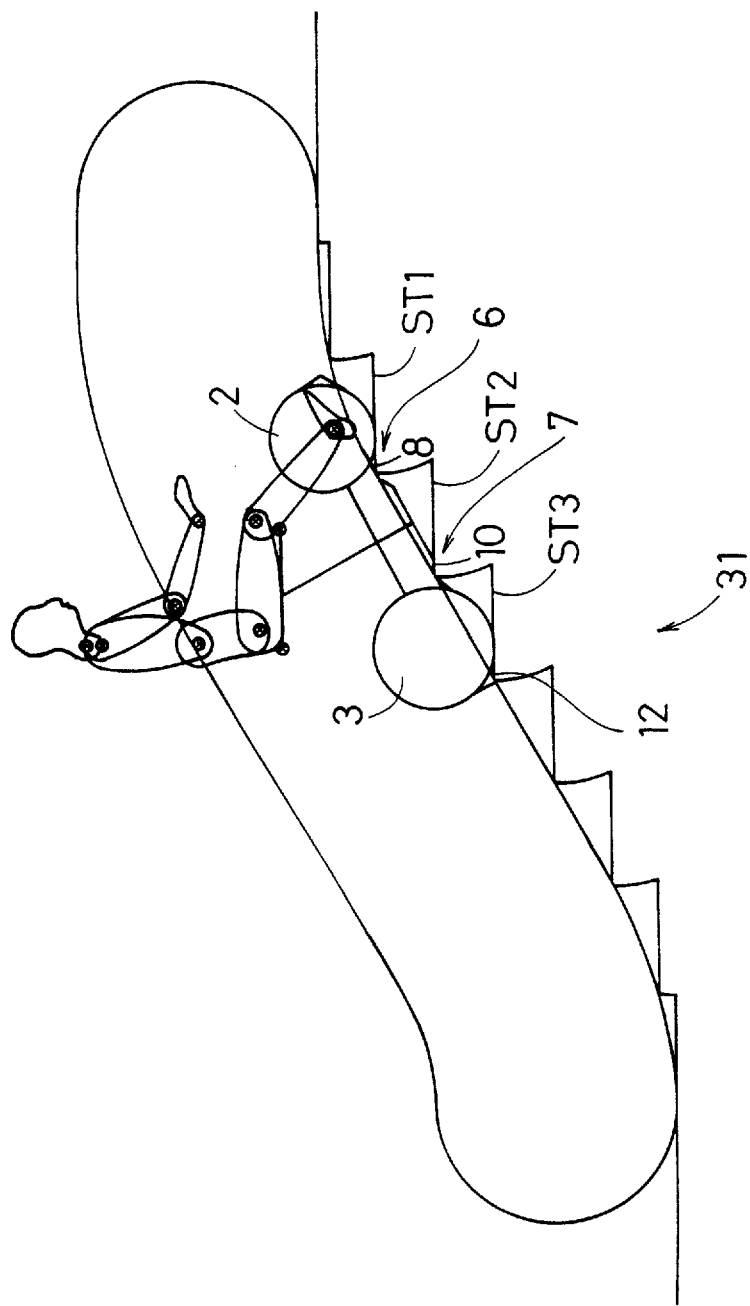
FIG. 8 is a schematic view showing the motorized cart depicted in FIG. 6 fully mounted on an ascending escalator.

As shown in FIG. 8, the first contact surface 8 of the first support portion 6 is brought into contact with the step surface ST1 when the slant angle of the escalator 31 is at a maximum. The first contact surface 10 of the second support portion 7 is brought into contact with the step surface ST2, and the third support portion 12 is brought into contact with the step surface ST3.

As the slant angle of the escalator 31 gradually decreases near the top, so too does the slant angle of the vehicle body. When this occurs, the front wheels 2, 2 and the rear wheels 3, 3 are brought back into contact with the step surfaces, and the first contact surface 8 of the first support portion 6, the first contact surface 10 of the second support portion 7 and the third support portion 12 are separated away from the step surfaces. When the step surface ST1 (where the front wheels 2, 2 are positioned) is at the uppermost portion of the escalator 31, the front wheels 2 are further advanced together with the movement of the step surface ST3 (where the rear wheels 3 are positioned). When the step surface ST3 reaches the uppermost portion of the escalator 31, the front wheels 3 are driven by the drive mechanism 23 to thereby advance the vehicle off of the escalator 31.

Using the motorized cart of the present invention to ride on an descending escalator will now be described.

Figure 9:
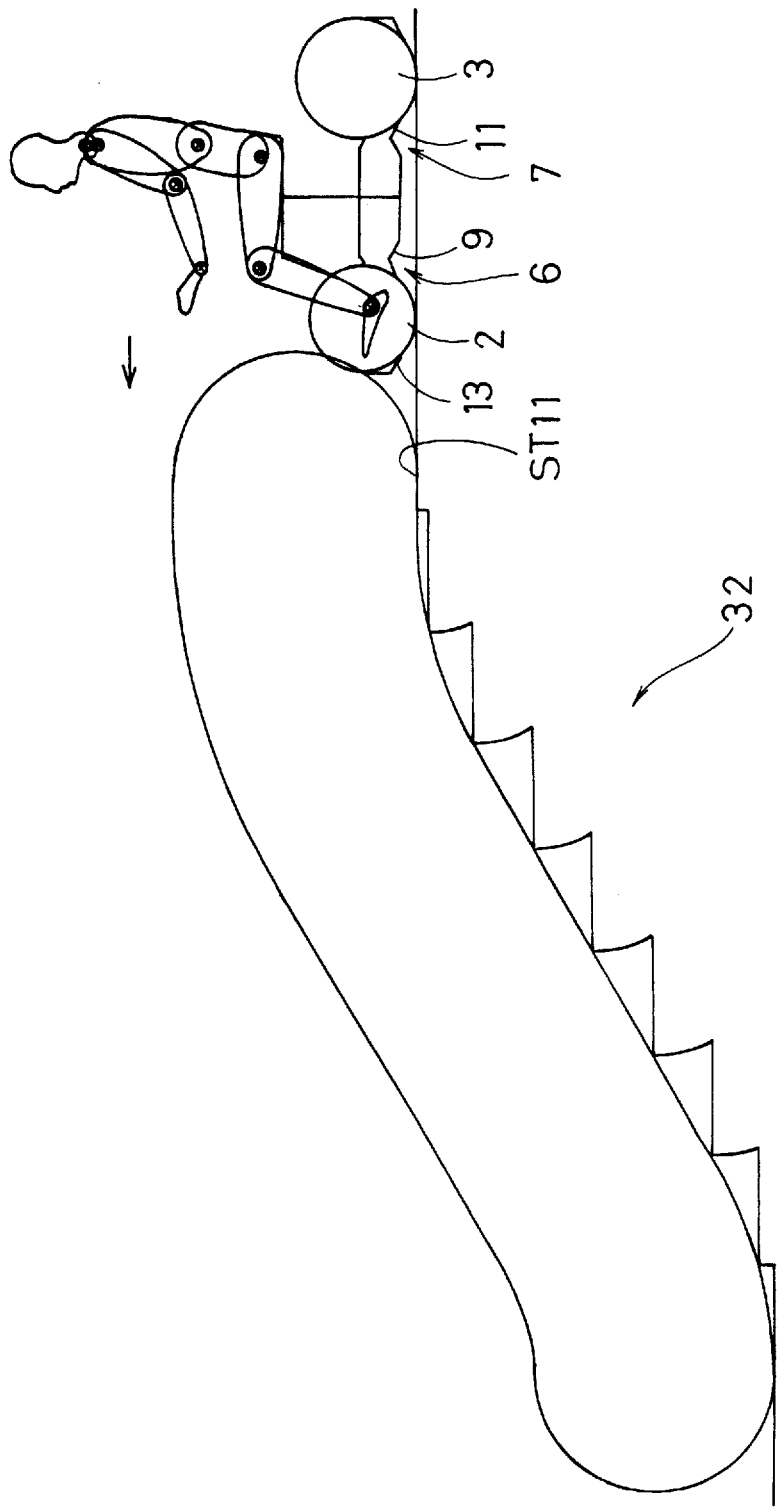
FIG. 9 is a schematic view showing the motorized cart depicted in FIG. 1 at the top of a descending escalator.

As shown in FIG. 9, when the vehicle approaches the top of the descending escalator 32, the vehicle body 1 is advanced up to a position where the front wheels 2, 2 are positioned on the step surface ST11. After the front wheels 2, 2 have been positioned on the step surface ST11, the vehicle is advanced by driving the rear wheels 3, 3 by means of the drive mechanism 23 at substantially the same speed as that of the escalator 32. The front wheels 2, 2 on the step ST11 are moved downward, and at the same time, the vehicle body 1 inclines gradually downward.

As shown in FIG. 10, when the rear wheels 3, 3 reach the step surface ST13, the vehicle body 1 is stopped by the brake portion 24. After the front wheels 2, 2 and the rear wheels 3, 3 have been positioned on the step surface of the escalator 32 together, the slant angle of the vehicle body 1 increases. When the slant angle of the vehicle body 1 is at its maximum, the second contact surface 9 of the first support portion 6 is brought into contact with the step surface ST12, and the second contact surface 11 of the second support portion 7 is brought into contact with the step surface ST13. In addition, the fourth support portion 13 at the front end of the vehicle body 1 is brought into contact with the step surface ST11. Thus, the front wheels 2 and the rear wheels 3 are separated away from the step surfaces of the escalator 32.

As the vehicle body 1 reaches the bottom of the escalator 32, the slant angle thereof is decreased. As a result, as shown in FIG. 11, the front wheels 2 and the rear wheels 3 are brought into contact with the step surfaces and the second contact surface 9 of the first support portion 6, the second contact surface 11 of the second support portion 7 and the fourth support portion 13 are separated away from the step surfaces.

When the step surface ST11 reaches the lowermost portion of the escalator 32, the cart is moved forward and the front wheels 2 are separated away from the escalator 32. When the step surface ST13 reaches the lowermost portion of the escalator 32, the cart is advanced by driving the rear wheels 3 with the drive mechanism 23 and the cart separates from the escalator 32.

As described above, in the motorized cart according to one embodiment of the present invention, it is possible to mount the vehicle on an escalator in stable manner, and to provide a high degree of safety with a simple construction.

The present invention may be modified in a number of different ways. For example, in order to maintain the seat of the cart in a horizontal level while riding an escalator, it is possible to provide a mechanism underneath the seat 4 which lifts it such that it is maintained in a horizontal position at all times.

It is also possible to modify the cart of the foregoing embodiment to be a front wheel drive system or a four wheel drive system.

Support portions that are different in shape, angle and number may also be provided on the lower surface of the vehicle body 1. This makes it possible to mount the cart on an escalator which is of non-standard dimensions.

In addition, the first to fourth support portions 6, 7, 12 and 13 may be constructed so as to be movable up and down. They may be retracted upward during normal travel, and brought into contact with the step portions when the vehicle is positioned on the escalator.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A motorized vehicle for engaging moving surfaces of an escalator, the escalator defining a maximum slope angle γ relative to horizontal, the vehicle comprising:

a body supporting front and rear wheels, said body including at least one underside transverse support channel having a first surface which defines an angle α relative to horizontal and a second surface which defines an angle β relative to horizontal, a rear portion of said body fitted with a rear support having an inclined surface which defines the angle α relative to horizontal, a front portion of said body fitted with a front support having an inclined surface which defines the angle β, the angles α and β measured with said body in a horizontal orientation, the absolute value of the angle α being equal to the absolute value of the angle β and the absolute values of the angles α and β being approximately equal to the stairway maximum slope angle γ of the escalator;

drive means for powering at least one of said front and rear wheels;

whereby:

with said body ascending the escalator, said first surface and said inclined surface of said rear support are configured for engagement with corresponding moving surfaces of the escalator such that the corresponding moving surfaces of the escalator, said first surface and said inclined surface of said rear support are generally parallel with one another; and, whereby:

with said body descending the escalator, said second surface and said inclined surface of said front support are configured for engagement with corresponding moving surfaces of the escalator such that the corresponding moving surfaces of the escalator, said second surface and said inclined surface of said front support are generally parallel with one another.

2. The motorized vehicle as set forth in claim 1, wherein said body supports a seat for a human rider.

3. The motorized vehicle as set forth in claim 2, wherein an operational panel is fixed to said body proximate said seat, said operational panel is configured for controlling movement and braking of said body.

4. The motorized vehicle as set forth in claim 1, wherein in response to said body ascending the escalator, said first surface and said inclined surface of said rear support are further configured such that at least said one of said front and rear wheels is disengaged from an adjacent moving surface of the escalator.

5. The motorized vehicle as set forth in claim 1, wherein in response to said body descending the escalator, said second surface and said inclined surface of said front support are further configured such that at least said one of said front and rear wheels is disengaged from an adjacent moving surface of the escalator.

6. A motorized vehicle for engaging moving surfaces of an escalator, the escalator defining a maximum slope angle γ relative to horizontal, the vehicle comprising:

a body supporting front and rear wheels, said body including first and second underside transverse support channels, said first and second underside transverse support channels being generally parallel to one another, each of said first and second underside transverse support channels having a first surface which defines an angle α relative to horizontal and a second surface which defines an angle β relative to horizontal, a rear portion of said body fitted with a rear support having an inclined surface which defines the angle α relative to horizontal, a front portion of said body fitted with a front support having an inclined surface which defines the angle β, the angles α and β measured with said body in a horizontal orientation, the absolute value of the α angle a being equal to the absolute value of the angle β and the absolute values of the angles α and β being approximately equal to the stairway maximum slope angle γ of the escalator;

drive means for powering at least one of said front and rear wheels;

whereby:

with said body ascending the escalator, said first surfaces and said inclined surface of said rear support are configured for engagement with corresponding moving surfaces of the escalator such that the corresponding moving surfaces of the escalator, said first surfaces and said inclined surface of said rear support are generally parallel with one another; and, whereby:

with said body descending the escalator, said second surfaces and said inclined surface of said front support are configured for engagement with corresponding moving surfaces of the escalator such that the corresponding moving surfaces of the escalator, said second surfaces and said inclined surface of said front support are generally parallel with one another.

7. The motorized vehicle as set forth in claim 6, wherein said body supports a seat for a human rider.

8. The motorized vehicle as set forth in claim 7, wherein an operational panel is fixed to said body proximate said seat, said operational panel is configured for controlling movement and braking of said body.

9. The motorized vehicle as set forth in claim 6, wherein in response to said body ascending the escalator, said first surfaces and said inclined surface of said rear support are further configured such that at least said one of said front and rear wheels is disengaged from an adjacent moving surface of the escalator.

10. The motorized vehicle as set forth in claim 6, wherein in response to said body descending the escalator, said second surfaces and said inclined surface of said front support are further configured such that at least said one of said front and rear wheels is disengaged from an adjacent moving surface of the escalator.

11. A motorized vehicle for engaging moving surfaces of an escalator, the escalator defining a maximum slope angle γ relative to horizontal and corners of adjacent surfaces of the escalator defining a riser-to-riser slope length L, the vehicle comprising:

a body supporting front and rear wheels, said body including first and second underside transverse support channels, said first and second underside transverse support channels being generally parallel to one another, each of said first and second underside transverse support channels being separated from centers thereof by the length L, each of said first and second underside transverse support channels having a first surface which defines an angle α relative to horizontal and a second surface which defines an angle β relative to horizontal, the angles α and β measured with said body in a horizontal orientation, the absolute value of the angle α being equal to the absolute value of the angle β and the absolute values of the angles α and β being approximately equal to the stairway maximum slope angle γ of the escalator;

drive means for powering at least one of said front and rear wheels;

whereby:

with said body ascending the escalator, said first surfaces are configured for engagement with corresponding moving surfaces of the escalator such that the corresponding moving surfaces of the escalator and said first surfaces are generally parallel with one another; and, whereby:

with said body descending the escalator, said second surfaces are configured for engagement with corresponding moving surfaces of the escalator such that the corresponding moving surfaces of the escalator and said second surfaces are generally parallel with one another.

12. The motorized vehicle as set forth in claim 11, wherein said body supports a seat for a human rider.

13. The motorized vehicle as set forth in claim 12, wherein an operational panel is fixed to said body proximate said seat, said operational panel is configured for controlling movement and braking of said body.

14. The motorized vehicle as set forth in claim 11, wherein:

a rear portion of said body fitted with a rear support having an inclined surface which defines the angle α relative to horizontal, a front portion of said body fitted with a front support which defines an inclined surface which defines the angle β; and whereby:

with said body ascending the escalator, said inclined surface of said rear support is also configured for engagement with corresponding moving surfaces of the escalator such that the corresponding moving surfaces of the escalator and said inclined surface of said rear support are generally parallel with one another; and, whereby:

with said body descending the escalator, said inclined surface of said front support is also configured for engagement with corresponding moving surfaces of the escalator such that the corresponding moving surfaces of the escalator and said inclined surface of said front support are generally parallel with one another.

15. The motorized vehicle as set forth in claim 14, wherein in response to said body ascending the escalator, said first surfaces and said inclined surface of said rear support are further configured such that at least said one of said front and rear wheels is disengaged from an adjacent moving surface of the escalator.

16. The motorized vehicle as set forth in claim 14, wherein in response to said body descending the escalator, said second surfaces and said inclined surface of said front support are further configured such that at least said one of said front and rear wheels is disengaged from an adjacent moving surface of the escalator.

* * * * *